(12) United States Patent
Pasupuleti et al.

(10) Patent No.: US 8,392,388 B2
(45) Date of Patent: Mar. 5, 2013

(54) ADAPTIVE LOCKING OF RETAINED RESOURCES IN A DISTRIBUTED DATABASE PROCESSING ENVIRONMENT

(75) Inventors: Kantikiran Krishna Pasupuleti, Visakhapatnam (IN); Anusha Sivananainthaperumal, Chennai (IN); Jihong Jin, Englewood, CO (US)

(73) Assignee: Sybase, Inc., Dublin, CA (US)

( * ) Notice: Subject to any disclaimer, the term of this patent is extended or adjusted under 35 U.S.C. 154(b) by 140 days.

(21) Appl. No.: 12/877,504

(22) Filed: Sep. 8, 2010

(65) Prior Publication Data

US 2012/0059963 A1   Mar. 8, 2012

(51) Int. Cl.
*G06F 7/00* (2006.01)
*G06F 17/00* (2006.01)
(52) U.S. Cl. .......................... 707/704; 707/781; 707/785
(58) Field of Classification Search .................. 707/704, 707/781, 785, 786, 787, 788
See application file for complete search history.

(56) References Cited

U.S. PATENT DOCUMENTS

| | | | | |
|---|---|---|---|---|
| 5,301,290 A | * | 4/1994 | Tetzlaff et al. | 711/142 |
| 5,327,556 A | * | 7/1994 | Mohan et al. | 707/695 |
| 5,890,153 A | * | 3/1999 | Fukuda et al. | 707/704 |
| 5,966,706 A | * | 10/1999 | Biliris et al. | 707/999.002 |
| 6,334,134 B1 | * | 12/2001 | Haderle et al. | 707/999.205 |
| 7,676,632 B2 | * | 3/2010 | Miller | 711/128 |
| 7,788,243 B2 | * | 8/2010 | Pasupuleti et al. | 707/704 |
| 7,921,090 B2 | * | 4/2011 | Ho et al. | 707/704 |
| 2006/0101081 A1 | * | 5/2006 | Lin et al. | 707/200 |
| 2008/0022046 A1 | * | 1/2008 | Miller | 711/128 |
| 2008/0065644 A1 | * | 3/2008 | Pasupuleti et al. | 707/10 |
| 2008/0172429 A1 | * | 7/2008 | Lin et al. | 707/205 |
| 2008/0208938 A1 | * | 8/2008 | Lin et al. | 707/206 |

* cited by examiner

*Primary Examiner* — Phong Nguyen
(74) *Attorney, Agent, or Firm* — Sterne, Kessler, Goldstein & Fox PLLC

(57) ABSTRACT

System, method, computer program product embodiments and combinations and sub-combinations thereof for adaptive locking of retained resources in a distributed database processing environment are provided. An embodiment includes identifying a locking priority for at least a portion of a buffer pool, determining lock requests based upon the identified locking priority, and granting locks for the lock requests.

18 Claims, 5 Drawing Sheets

ADAPTIVE LOCKING OF RETAINED RESOURCES IN A DISTRIBUTED DATABASE PROCESSING ENVIRONMENT

BACKGROUND

1. Field of the Invention

The present invention relates generally to data processing environments, and more particularly to adaptive locking of retained resources in a distributed database processing environment.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In recent years, users have demanded that database systems be continuously available, with no downtime, as they are frequently running applications that are critical to business operations. Shared Disk Cluster systems are distributed database systems introduced to provide the increased reliability and scalability sought by customers. A Shared Disk Cluster database system is a system that has a cluster of two or more database servers having shared access to a database on disk storage. The term "cluster" refers to the fact that these systems involve a plurality of networked server nodes that are clustered together to function as a single system. Each node in the cluster usually contains its own CPU and memory and all nodes in the cluster communicate with each other, typically through private interconnects. "Shared disk" refers to the fact that two or more database servers share access to the same disk image of the database. Shared Disk Cluster database systems provide for transparent, continuous availability of the applications running on the cluster with instantaneous failover amongst servers in the cluster. When one server is down (e.g., for upgrading the CPU) the applications are able to continue to operate against the shared data using the remaining machines in the cluster, so that a continuously available solution is provided. Shared Disk Cluster systems also enable users to address scalability problems by simply adding additional machines to the cluster, without major data restructuring and the associated system downtime that is common in prior SMP (symmetric multiprocessor) environments that provide fast performance by making multiple CPUs available to complete individual processes simultaneously (multiprocessing).

In any database system, distributed or otherwise, data can be organized and accessed as "pages". When data is brought from the disk into the main memory, "page" is the basic unit of access. Within the page, the data can be present as "rows". For a transactional system, multiple transactions can be active on a single page at any point of time, each accessing a subset of rows within the page, when the system uses row-level locking.

In a distributed system such as shared disk cluster, transactional locks or logical locks are used for transactional consistency. These locks can either be page-level locks in which the entire page is locked, or row-level locks in which a particular row in a page is locked, or higher-level locks, such as table locks that are used to lock the entire table. These locks are held for relatively long duration, e.g., until the end of the transaction.

For physical consistency of the page, such as when multiple transactions are modifying different rows in the same page at the same time, physical locks, also called latches in popular SMP terminology, are used. These locks are held for relatively short duration, e.g., only for the time it takes to modify the data in the page in memory. With the help of physical locks, the physical operations on a particular page are serialized under typical conditions. Commonly, these locks can be acquired in "shared" mode, "exclusive" mode, or "null" mode, where a shared physical lock is compatible with other shared physical locks but incompatible with an exclusive physical lock, and an exclusive physical lock is incompatible with shared and exclusive physical locks but compatible with "null" physical locks.

In a distributed system, the physical locks are retained at each node until they are claimed by other nodes. The retention of the locks in this manner avoids unnecessary repeated acquisition cycles that might occur if the locks are released immediately. For physical consistency, often, a two-level lock is used. The first level is the inter-node synchronization where the cluster-wide "physical lock" is acquired and the next level is an intra-node synchronization where the "latch" is acquired. The cluster-wide physical lock gives the right of access to a particular node that has acquired the lock, while the "latch" gives the right of access to a particular task within that node that has the physical lock.

The access to the page, i.e., the latches as well as the physical locks, is granted on a "first come, first served" basis. For instance, if a task requests a shared, SH, latch and is granted the latch, a second task requesting for the latch in exclusive, EX, mode will be blocked and be queued in a wait queue. If a third task requests the latch in SH mode, it too will blocked, and be placed behind the second task requesting for the EX latch in the wait queue. The behavior for the physical lock is similar at the node-level.

Whenever an attempt is made to physically lock a particular page p1 in a pool, it is desirable to lock the entire pool, if there is no contention, for I/O benefit. Pools are written out to disks and read from disks in entirety, which gives significant I/O benefit, since separate I/O on individual pages is much costlier. Also, pools are used in situations where it is assumed that in all likelihood, the subsequent pages in the pool will be accessed immediately and locking the pool will be of great benefit.

In a shared disk cluster, which supports independently configured large buffer pools at each of its nodes (i.e. the size of the buffer pools can vary at each node independent of the other nodes), a particular page can be present in two nodes in different pools at the same time. By way of background, U.S. patent application Ser. No. 11/675,323, entitled "System and Methods for Optimizing Data Transfer among Various Resources in a Distributed Environment", assigned to the assignee of the present invention, describes buffer pools in a distributed system. For instance, if a page p1 resides in the cluster at nodes N1 and N2 and is being shared among them with SH physical locks, it is possible that the page is present in a 1-page pool at N1 and a 4-page pool at N2, the page pool including adjacent pages, say p2, p3, and p4. When a task holds a physical lock on one page p1 at node N1 and tries to lock another page p2, locking the pool would also mean having to downgrade locks on p1, p3 and p4 at N2. This can cause deadlocks, such as, for example, if another task at N2 already holds a physical lock on p4 by this time and is requesting lock on p1. It is difficult for the cluster lock manager to detect such deadlocks, especially since it has to get information about the latches involved, which can change quite quickly and such distributed deadlock detection has to happen for every latch request, which is costly.

Accordingly, a need exists for an approach to reduce contention and avoid deadlocks in a distributed system that avoids the limitations and shortcomings of prior approaches and provides more optimized control for physical access. The present invention addresses this and other needs.

BRIEF SUMMARY

Briefly stated, the invention includes system, method, computer program product embodiments and combinations and sub-combinations thereof for adaptive locking of retained resources in a distributed database processing environment. An embodiment includes identifying a locking priority for at least a portion of a buffer pool, determining lock requests based upon the identified locking priority, and granting locks for the lock requests.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
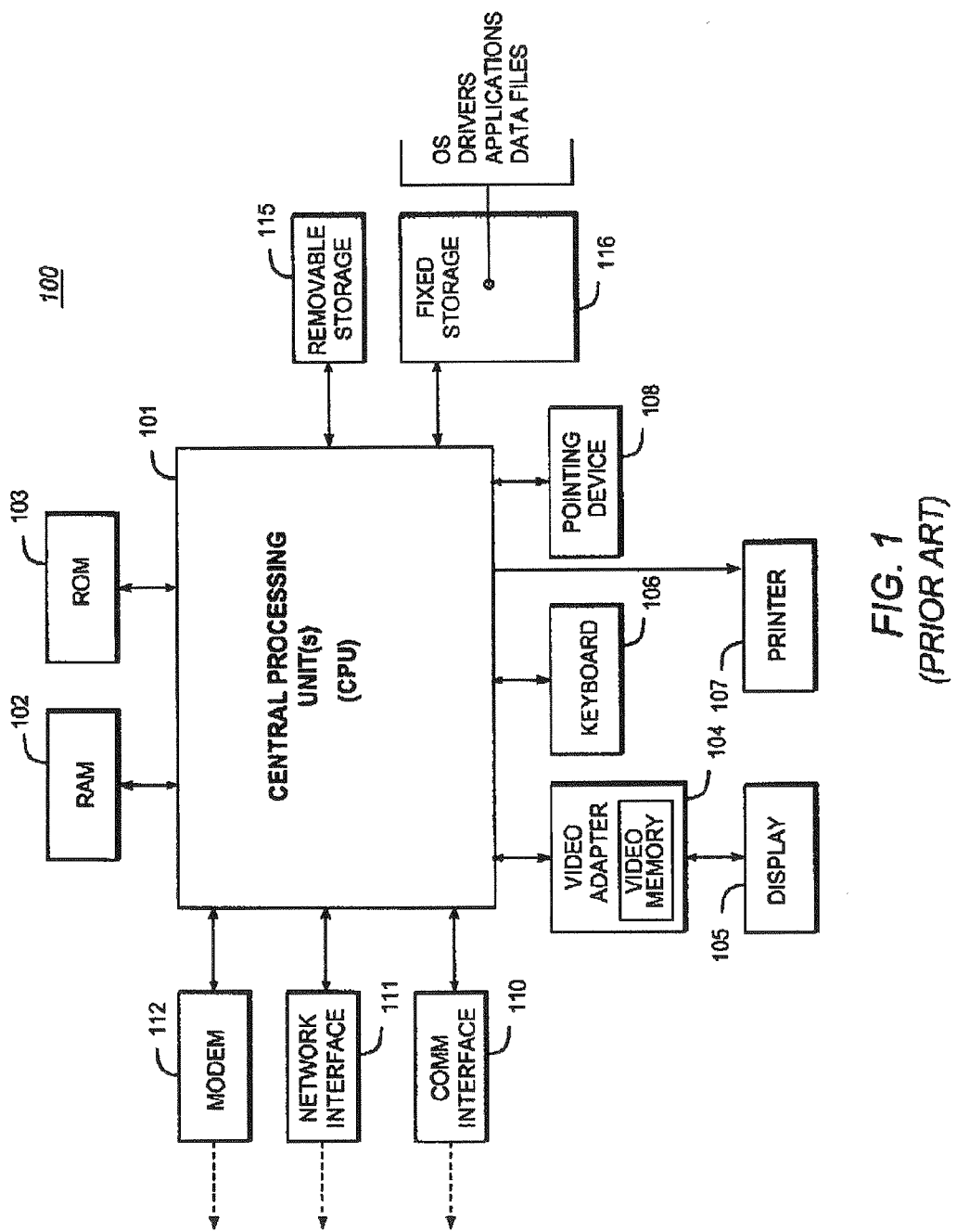
FIG. 1 illustrates a very general block diagram of a computer system (e.g., an IBM-compatible system) in which software-implemented processes of the present invention may be embodied.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for adaptive locking of retained resources in a distributed database processing environment.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. For example, although the following describes embodiments for distributed systems, it should be readily appreciated that the aspects of the invention are equally applicable to non-distributed systems, as well.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Glossary

The following definitions are offered for purposes of illustration, not limitation, in order to assist with understanding the discussion that follows.

ASE: Sybase™ Adaptive Server™ Enterprise, an enterprise relational database system available from Sybase, Inc. of Dublin, Calif.

Buffer pool: A memory pool that holds a set of contiguous pages in a cache. A cache at a node comprises a set of buffer pools of various sizes.

Cache: A memory segment in the node that is used to store database pages (e.g., table pages, index pages, or the like). Requests for pages can be honored from memory, thereby avoiding disk access.

Nodes (instances): Refers to an instance of ASE server running on a host computer or an equivalent, as part of a cluster of similar servers running on the same/other computers.

Persistent storage (disk): Refers to any resource that stores persistent data to be accessed and is possibly slower than main memory.

Buffer: Refers to metadata information to maintain a page on disk in memory.

k: Abbreviation for kilobyte.

Page: Refers to the physical page on disk.

MASS: A set of buffers (1, 2, 4 or 8) of contiguous pages used for large I/Os.

Physical lock: Locks maintained by the Cluster Lock Manager (CLM) to establish ownership of a page. These locks are Node specific and are held by a node as long as there are no conflicting requests in the cluster.

BAST: Short for blocking asynchronous trap. In a case of conflicting lock request, the Cluster Lock Manager (CLM) provides a mechanism to notify the holder to release/downgrade the lock. This mechanism is a blocking call and is known as BAST.

AST: Short for asynchronous trap. In case of a queued lock request, the Cluster Lock Manager (CLM) provides a mechanism to notify/wakeup the requester about the completion of lock request. This mechanism is asynchronous and is known as AST.

CLM: Cluster Lock Manager that performs lock management functions (e.g., granting exclusive or shared lock for a given database page).

BCM: Buffer Coherency Manager that performs memory management functions.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem). The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Figure 2:
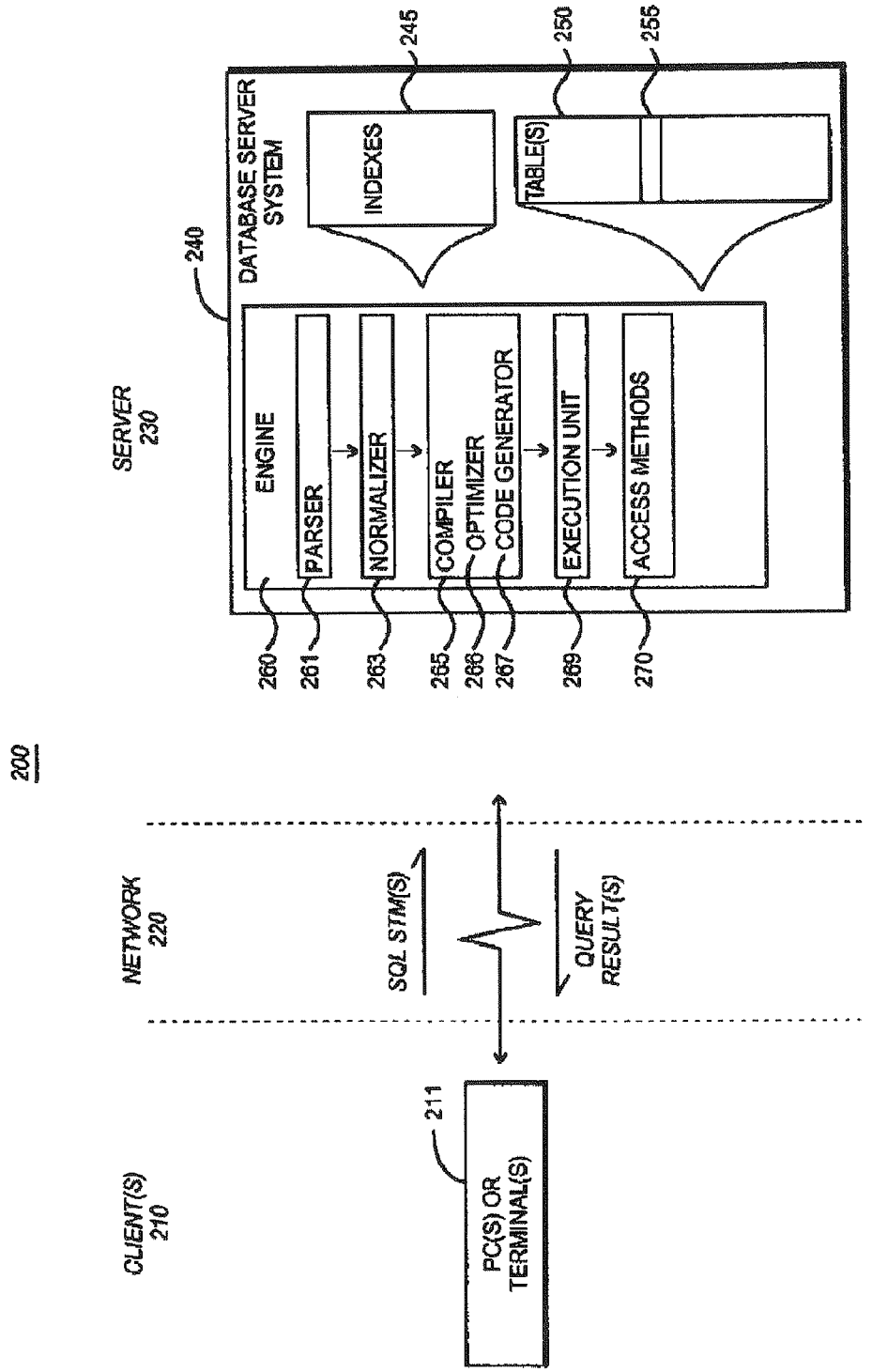
FIG. 2 illustrates the general structure of a client/server database system 200 suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft™ Windows client operating system (e.g., Microsoft™ Windows 95/98, Windows 2000, Windows XP, Windows Vista).

The database server system 240, which comprises Sybase™ Adaptive Server™ Enterprise (available from Sybase, Inc. of Dublin, Calif.) in an exemplary embodiment, generally operates as an independent process (i.e., independently of the clients), running under a server operating system such as Microsoft™ Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase™-branded database servers and client/server environments generally, see, e.g., Nath, A., "The Guide to SQL Server", Second Edition, Addison-Wesley Publishing Company, 1995. For a description of Sybase™ Adaptive Server™ Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb (kilobyte) to 32 Kb, with the most common page sizes being 2 Kb and 4 Kb. For purposes of the description that follows, it will be assumed that the database page size is 2 Kb, although it can be one of 2 Kb, 4 Kb, 8 Kb and 16 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record, which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying computer components (e.g., database server) that may be employed for implementing the present invention. For purposes of discussion, the following description will present examples in which it will be assumed that there exists a "server" (e.g., database server) for purposes of implementing the processes described below. In typical operation, such a server communicates with one or more other computers, including "clients" (e.g., customer or end-user computers that are "database clients" of the server). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Figure 3:
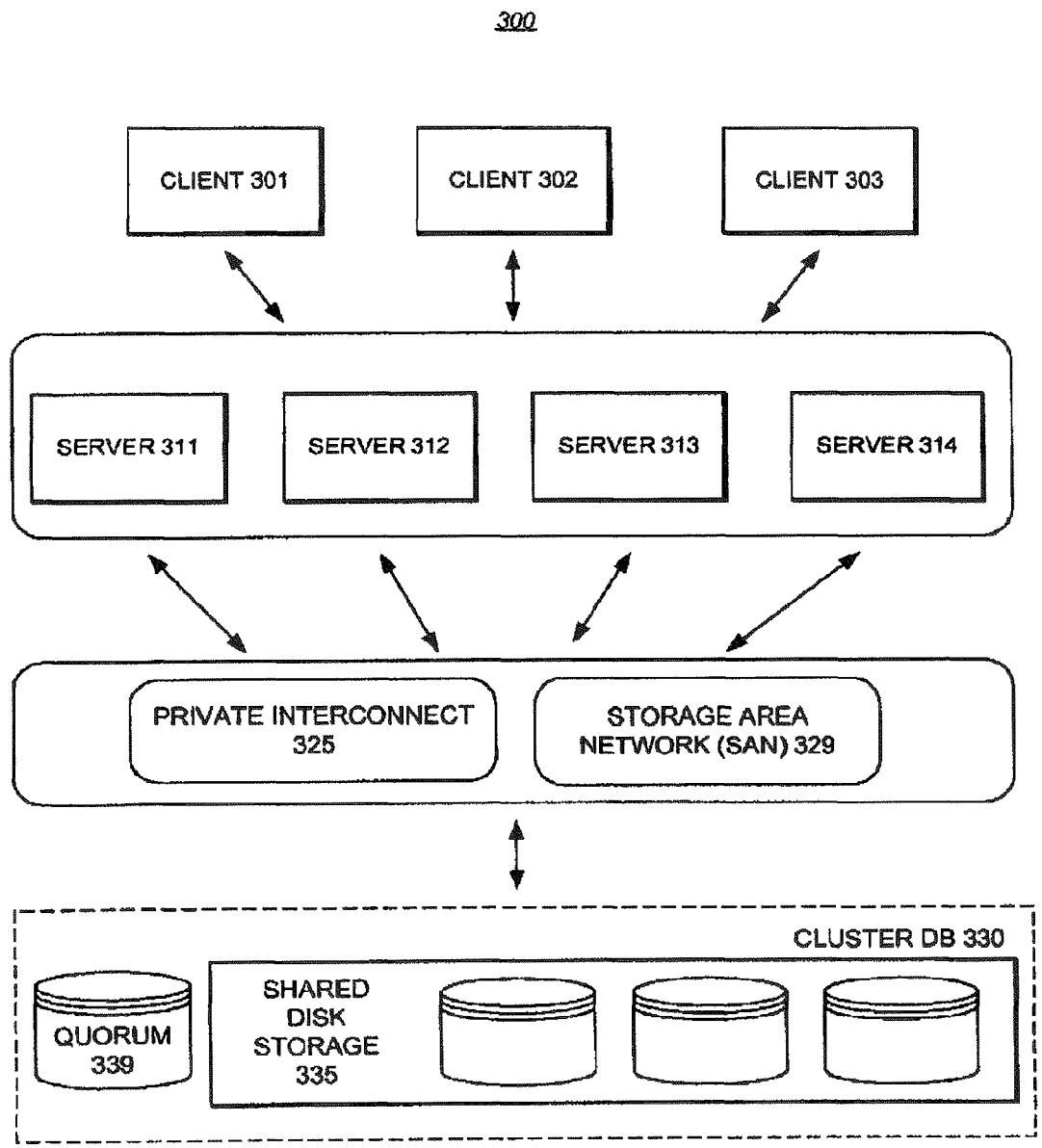
FIG. 3 illustrates a high-level block diagram of a Shared Disk Cluster database system environment useful for implementing components of embodiments of the invention.

As previously mentioned, one type of architecture of a distributed database system is a shared disk cluster (SDC) architecture. In this architecture, multiple computer systems, each with a private memory share a common collection of disks. Each computer system in a SDC is also referred to as a node. FIG. 3 is a high-level block diagram of a Shared Disk Cluster database system environment 300 illustrating an example of a four node (servers 311, 312, 313, 314) Shared Disk Cluster accessed by a plurality of clients (clients 301, 302, 303). The term "cluster" refers to a collection of more than one networked (and usually homogeneous) nodes, which function as a single system. Each node generally contains its own CPU and memory resources. The term "clustered server" refers to a database server (currently implemented using Sybase™ Adaptive Server™ Enterprise ("ASE") available from assignee Sybase of Dublin, Calif.) which runs on a cluster (cluster DB 330) and jointly manages a single installation of the databases on the shared disk storage 335. As shown, the environment 300 also includes a quorum disk 339. The quorum disk 339 is a shared disk device used for cluster membership arbitration. The quorum disk also maintains a history of runtime cluster view changes.

A Shared Disk Cluster database system can be implemented using low cost "blade servers" such as Intel/Linux machines. In the presently preferred embodiment, nodes in the cluster communicate with each other through private interconnects (e.g., private interconnect 325). As shown at FIG. 3, the nodes are interconnected via redundant high-speed interconnects with each node also having a direct connection to all databases on a disk subsystem. Gigabit Ethernet and Infiniband may be used to provide these high-speed interconnects. The storage subsystem may be implemented using raw device support with a storage area network (SAN 329) or with file system support (e.g., through use of a clustered file system such as those from Veritas or Polyserv).

The above-described computer hardware and software are presented for purposes of illustrating the basic underlying desktop and server computer components that may be employed for implementing the present invention. For purposes of discussion, the following description will present examples in which it will be assumed that there exist multiple server instances (e.g., database servers) in a Shared Disk Cluster environment that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Figure 4:
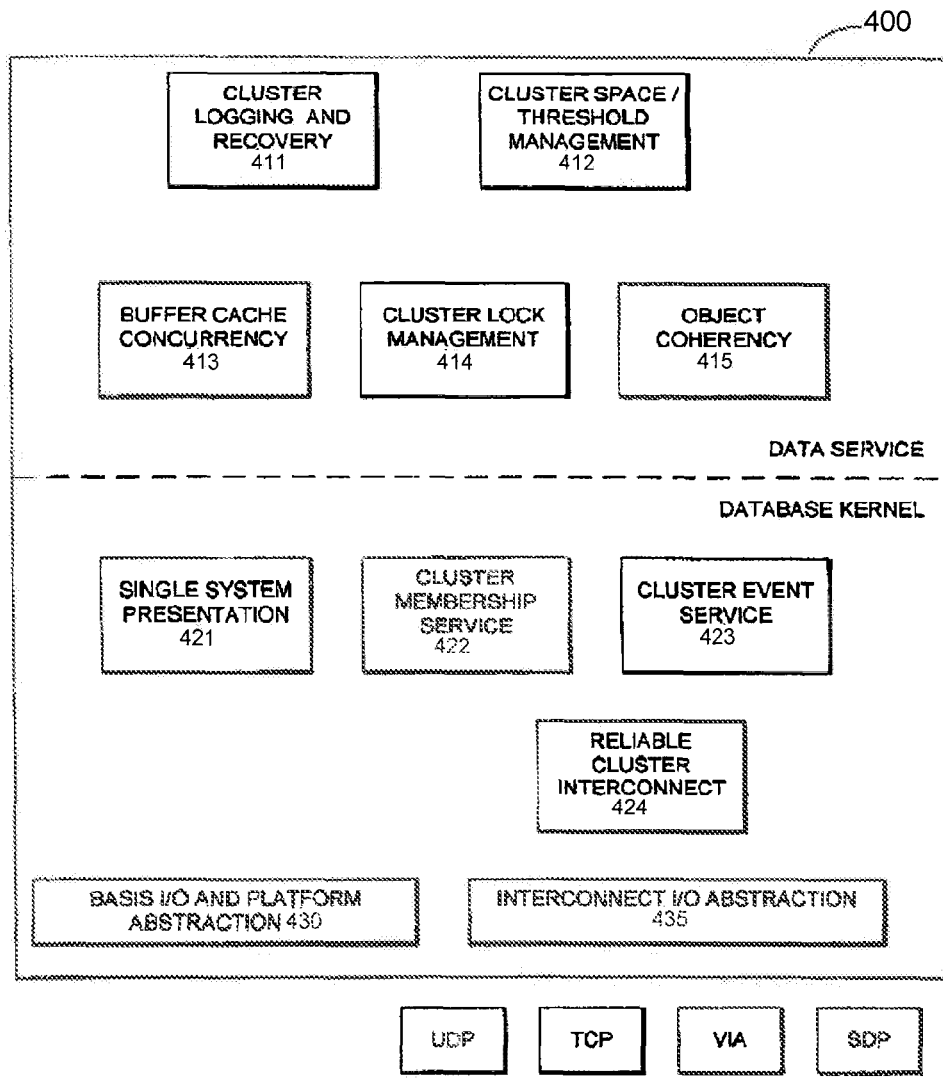
FIG. 4 is a block diagram illustrating components of an instance of a clustered database server implementing the shared disk cluster system and methodology of the present invention.

FIG. 4 is a block diagram illustrating components of an instance of a clustered database server 400 implementing the shared disk cluster system and methodology of the present invention. As shown, components of an instance of a clustered database server 400 include data service level components and database server kernel level components. For simplicity, other conventional modules of the database system are not shown at FIG. 4. Also, the diagram shown at FIG. 4 does not attempt to illustrate the inter-dependencies among the cluster-aware components in a data server and in the kernel.

The components provided at the database kernel level include a single system presentation 421, a cluster membership service module 422, a cluster event service 423, and a reliable cluster interconnect module 424. These components are native cluster infrastructure components that enable the clustered database servers to run in a shared disk cluster environment. The cluster membership service module 422 maintains cluster membership and detects member failure. A responsibility of cluster membership service 422 is to detect cluster membership changes and maintain a reliable and consistent run time cluster view to all clustered servers. The cluster interconnect module 424 provides messaging services and an interconnect abstraction layer to allow clustered servers to communicate with each other via redundant interconnects. The cluster event service 423 supports a generic event publishing and subscription mechanism for cluster-wide events. The single system presentation module 421 supports single database presentation to clients and redirects client connections based on workload of the clustered servers and/or other criteria, such as application partitioning.

The database kernel level components also include a basis I/O and platform abstraction module 430 and an interconnect I/O abstraction module 435. An I/O abstraction layer is provided on top of the cluster platform specific private interconnects. It also supports redundant cluster interconnects (if available) with automatic fail-overs in the event of a link failure. The redundant cluster interconnects can be used to achieve both load balancing and high availability. As also shown at FIG. 4, several protocols are also supported under the I/O abstraction layer, including UDP (datagram socket), TCP (stream socket), VIA (Virtual Interface Architecture) and SDP (Socket Direct Protocol for Infiniband).

At the database data service level, components include a cluster logging and recovery module 411, a cluster space/threshold management module 412, a buffer cache coherency module 413, a cluster lock management module 414, and an object coherency module ("OCM") 415. The cluster logging and recovery module 411 deals with the issue of single logging from all clustered servers and fail-over database recovery. The cluster space and threshold management module 412 handles space utilization and implements threshold management methodology. The buffer cache coherency module 413 deals with the coherency issues related to shared buffer cache and cache-to-cache page transfer for allocation pages, index pages, data pages and OAM/GAM pages. The object coherency module 415 deals with the coherency issues related to sharing and transferring metadata and global variables in the shared disk cluster environment. The cluster lock management module 414 (or cluster lock manager which is sometimes referred to herein as the "CLM") supports distributed locking for coherency control across the shared disk cluster.

In operation, the CLM 414 comprises a module that is utilized to provide an interface (i.e., APIs) to lock individual database pages. Thus, the CLM 414 grants access to pages among the clusters, determines the optimal way of transferring the set of database pages, and takes the appropriate action, e.g., sending instruction messages to various nodes. Normally, when the CLM 414 gets a request for a physical lock from a node, it sends a downgrade request to any other node holding the lock in conflict mode asking it to downgrade the lock and possibly transfer the latest version of the page.

The CLM at the owner node takes the request and hands it over to the buffer manager at that node. The buffer manager will wait if the page within that node is being accessed in an incompatible mode (i.e., if there are any latches held in incompatible mode), and when all such incompatible latches are released, it downgrades the physical lock, at which point the physical lock can be granted to the requesting node. The task at the requesting node will then proceed to latch the page in the same mode and access it.

As an example, consider a task t1 at instance N1 holding an address lock on page p1 and asking for address lock on page p2 (and both the pages p1 and p2 are in different one-page MASSes). Consider another task t2 at instance N2 holding an address lock on page p3 and asking for an address lock on page p1. All address locks are requested in EX mode, and at N2, pages p2 and p3 are in a single MASS. There is no deadlock if the same situation happens in SMP, but in a cluster, the task t2, by virtue of holding an address lock on p3, is blocking the task t1's address lock request on p2, because physical locks are taken on the entire MASS. When t1 asks for address lock on p2, a downgrade request (for the physical lock) will go to instance N2, and all the locks on the MASS at N2 must be downgraded (i.e., locks on p2 and p3). But since t2 is holding an address lock on p3, the physical lock on p2 cannot be downgraded, causing a deadlock. These types of deadlocks lead to sub-optimal performance. Also the granularity of locking results in downgrades of locks on pages that may not be actually accessed by a remote node and can lead to sub-optimal performance. For instance a request at N1 for page p2 translates to a downgrade request on pages p2 and p3 at N2 with N2 losing both the locks even though p3 is not the requirement at N1 at that point.

From this straightforward example, it is clear that as the contention in the pool increases, there will be requests for different pages in the pool from other nodes. The greater the contention, the higher the likelihood of deadlocks. In order to avoid such deadlocks, an adaptive approach for the locking of retained resources is provided by embodiments of the present invention, as described more fully herein below.

In general, a client-controlled physical locking mechanism is provided to lock (and retain) part or whole of the buffer pool at the node-level (not transactional) that adapts to the inter-node contention in a distributed system (like shared-disk cluster). The client (i.e., the task needing to physically lock a particular buffer in a distributed environment) decides to lock a set of buffers in the pool transparently, and the method is adaptive, tuning itself to inter-node contention (i.e., locking to minimize contention). In this manner, locking is controlled by the clients and not by the CLM, with the clients being more aware of the access pattern for better ability to force better performance. For instance, a task performing a scan can choose to lock all the buffers in the pool. Another task may just be doing a point operation (but happens to find the page in a large pool) and will lock only the particular buffer. The embodiments of the invention facilitate certain clients to request for physical lock on a page, while holding physical lock on another page, and lock as much of a pool as possible without conflicting with requests from other nodes and hence without running into deadlocks. This will benefit, for example, a client performing an index and data row delete, where it will not be necessary to release the physical lock on the index page before accessing the data page.

Figure 5:
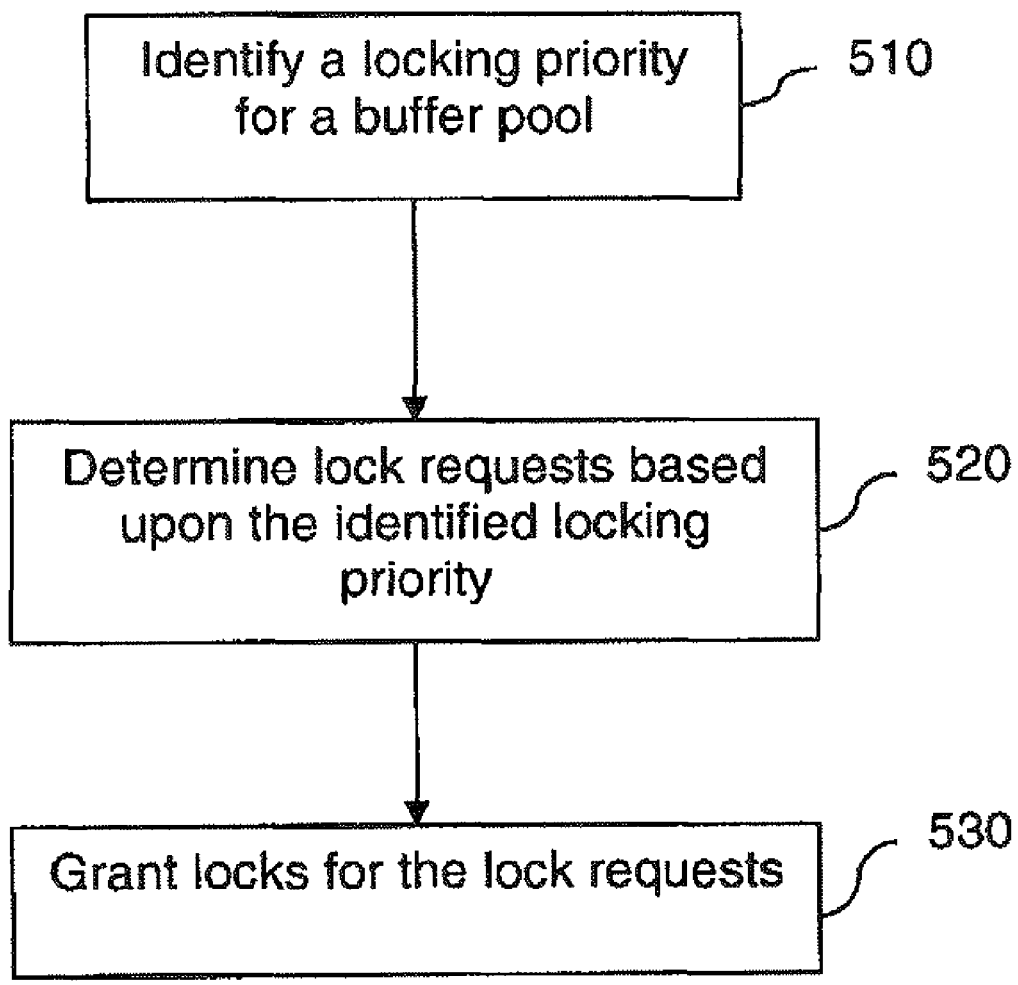
FIG. 5 illustrates a block diagram of an overall process for adaptive locking of retained resources of database information in accordance with an embodiment of the invention.

Referring now to FIG. 5, a block diagram of an overall process for adaptive locking of retained resources to avoid suboptimal performance due to deadlocks in accordance with an embodiment of the invention is presented. As shown, the process includes identifying a locking priority for at least a portion of a buffer pool (block 510). In an example, a buffer pool can consist of 1, 2, 4, or 8 pages, with the buffer size varying depending upon the chosen size of the page (e.g., 2 K, 4 K, 8 K, or 16 K). In general, a locking priority refers to an optimistic locking of the pool by the client, e.g., one part of the pool, designated as "mandatory part" for the part on which the lock is required, one part designated as "optional part" for the part on which a lock is desirable, and another part, designated as "ignore part" on which a lock is not of interest.

Once the locking priority is identified, lock requests are determined based upon the identified locking priority (block 520). For example, a lock needs to be requested on the "mandatory part" in an unconditional mode and requested on the "optional part" in a conditional mode. The "ignore part" is identified but no lock needs to be requested on it. Thus, the buffer manager asks for locks at the MASS level, as a set of pages, with typically one page identified as "page of interest" (POI) corresponding to the "mandatory part" and the rest as "optional" (although there can be more than one "page of interest"). The locking priority allows a more one-to-one mapping between node level physical lock and cluster level physical lock, so that there is not an all-or-nothing approach that would result in physical lock on all the pages in the MASS. For instance, a request may be made as lock_multiple_physical (Required($p_1$), Optional($p_2 \ldots p_n$)). The BCM expects that at the least the lock request on $p_1$ will be granted, while on $p_2$ to $p_n$, the locks need not necessarily be granted.

Lock granting then ensues for the lock requests (block 530). In general, the CLM takes the request and sends unconditional or conditional downgrade messages to the owner nodes (i.e., the nodes owning the locks), and depending on the response from the owner nodes, grants the locks to the requesting node. Thus, CLM grants the locks on the MASS if all the locks can be granted immediately, i.e., there is no conflict. If there is a conflict, CLM sends an appropriate BAST notification to the instance owning the "page of interest". For the optional pages, however, CLM always sends a CONDITIONAL BAST to the owning instance(s) to ensure that there is no waiting on them indefinitely.

For example, the above call may return as
{Granted (p1), {Granted(pi) . . . Granted(pj)}} where 2>i, j>n.
When the lock grant status on the optional pages are known, if the lock on POI can also be granted, CLM sends a single AST for all the pages in the MASS. If the lock on POI cannot be granted at that time, CLM sends an optional page AST to BCM indicating the lock grant status on all the optional pages alone, and at this moment, the MASS is officially broken in CLM. Then CLM waits till the lock on POI can be granted and sends the AST for the POI alone.

Thus, as long as there is no contention/conflicting lock requests, MASSes are kept "in-tact" at the instances. As conflicts occur, MASSes lose physical locks on some of the pages and are no longer complete until they regain those lost locks. A MASS that has all physical locks granted is referred to herein as a "complete MASS" and one which doesn't have all the locks is referred to as an "incomplete MASS".

The physical locks on each page of a MASS may be acquired, or upgraded, or downgraded, irrespective of that on the other pages in the MASS, although the locking is done so as to retain the "completeness" of the MASS as long as possible, and the bits that govern the synchronization related to physical lock, acquisition, upgrade, or downgrade, are maintained at each buffer in the MASS. Maintaining the bits at the MASS level as well depends upon individual systems needs, as is well appreciated by those skilled in the art. In the case of log scans, log pages are fetched in a large MASS, so that all the pages in a MASS are "pages of interest".

In an embodiment, when a task requests for a lock on a page in a MASS, it is examined if all the pages in the MASS are ready for that operation. If some of them are not, the lock request can be pruned to only the "pages of interest". However, it is also possible to prune it to the largest contiguous subset of pages on which the locks can be requested. Depending upon the particular situation, the buffer manager chooses any subset of pages on which locks are requested, as long as locks on the set of pages identified as "POI" are included in the set. For instance, if a MASS has four pages p1, p2, p3 and p4 and a task requests upgrade of the lock on page p1 (i.e., identifying it as the "page of interest") and the lock on p4 is being downgraded at the same time, the buffer manager can prune the request to locks on pages p1, p2 and p3, with p2 and p3 forming the optional set of locks, or it can request lock on p1 alone. Similarly, when a downgrade request comes to a node on a page and the page is found in a MASS, the buffer manager can decide whether to downgrade the lock on that page alone or a subset (or the entire set) of other locks in that MASS according to the needs of the situation. Thus, the embodiments of the invention include the ability to execute such decisions and deal with any subset of pages in the MASS for locking operations like acquire, upgrade or downgrade. In systems that allow the buffer manager to transfer pages across instances to the MASS at the requesting instance independent of each other, the buffer manager maintains a transfer status on each buffer of the MASS (and consequently the read status as well) to track the transfers of the respective pages.

By way of example, the following cases help illustrate the embodiments of the invention by describing the setting and clearing of signals associated with nodes and their requests. In general, the requester of a lock first examines the MASS and decides on the set of locks to be requested to the CLM. The "pages of interest" in that set are distinguished from the "optional set" and the "not interested set". Other tasks at the same node who require locks on pages in that MASS first examine if a lock request was already sent on the page(s) they require. They wait until such pending lock requests are resolved. The tasks are woken up as the lock requests are completed on each of those pages. If the prior lock request was a conditional one (i.e if the page fell in the "optional set" in the prior request), the lock can either be granted or failed, and tasks, after having woken up, will re-submit the request if the lock was not granted. For instance, suppose a MASS has pages p1 and p2, and a task T1 needs a lock on the page p1 and finds that no other task is using the MASS. So, T1 requests locks on both the pages identifying p1 as POI and p2 as optional. While the request is being honoured, if another task T2 needs a lock on the page p2, it waits until the earlier lock request receives a response. If the lock on p2 was granted, T2 moves ahead using the buffer but if the lock is not granted, T2 will request the lock on p2 identifying it as POI.

It is evident from this behaviour that the CLM needs to respond to the lock requester once the status of all the "optional set" of locks is available, irrespective of the status of the lock request on POI. The response will enable BCM to mark the buffers accordingly so that tasks can access other pages in the MASS and not block until the locks on POIs are available. In the above example, as soon as the status of the lock request on p2 is available (can be a grant or fail), the CLM sends an AST to the requesting node so that the tasks waiting on the page p2 either go ahead using the page or re-submit the request.

When a downgrade request reaches an owner of a set of locks (on pages in a MASS), there can be a combination of conditional and unconditional downgrade requests on individual pages, and the BCM splits them up accordingly. For a conditional downgrade, attempts to downgrade the lock are made until a chosen limit is reached, e.g., a certain time interval, after which, if the lock is still not available for downgrade, a failure is indicated to the CLM. If the lock becomes available before the chosen limit is reached, the lock is downgraded by informing the CLM. Unconditional downgrade, meanwhile, is blocked until the lock is available for downgrade (i.e. all conflicting users of the page exit).

The CLM treats the locks on the pages independent of each other. As soon as the optional page AST is sent by CLM, the MASS is officially broken in the CLM, and the CLM can entertain lock requests on those pages from any node. For example a node N1 requests locks on pages p1 and p2 (p1 as POI and p2 as optional), and as soon as the lock on p2 is granted/failed, the CLM picks up any pending requests on p2 from any of the nodes. However, if the lock on p1 is available the CLM can afford to wait until the lock on p2 is available, because the response to a conditional lock request will be available within the chosen limit. It should be noted that while the chosen limit is a time interval in an embodiment, this is meant as illustrative and not restrictive, and other alternative approaches can be used, such as moving ahead with the available lock on p1 as soon as it is available.

Further, in the following example, it should be appreciated that the described approach is meant as illustrative and not restrictive of the manner of signaling, and other approaches could be used without departing from the spirit and scope of the invention, as is well understood in the art. Further, the described combinations are meant as representative and not restrictive of the types of situations possible. In the subsequent description, "N" refers to nodes, "T" refers to tasks, "p" refers to page, "OP" refers to optional page, "POI" refers to a page of interest, "NIP" refers to not interested page, "Master" refers to the lock master for the page and can be any node in the cluster, "PR" refers to protected read mode of a physical lock, "NL" refers to null lock mode of a physical lock where the lock record exists as a placeholder but the actual lock is absent, and "EX" refers to exclusive lock.

In one case, suppose a request on the same MASS from the same instance is made. For example, consider the following the scenario:

1) N1's T1 asks for PR->EX for 8 page mass (p1-OP, p2-OP, p3-OP, p4-POI, p5-OP, p6-OP, p7-OP, p8-OP)
2) N2 owns PR on one page mass (p4) and owns PR on one page mass (p6), and there are no other instances that own any lock on (p1, p2, p3, p5, p7, p8).
3) N1's T2 asks for PR->EX for 8 page mass (p1-OP, p2-OP, p3-OP, p4-OP, p5-OP, p6-POI, p7-OP, p8-OP)

Based on these conditions:
1. N1's T2 is blocked in BCM since N1's T1's request has been submitted to
   CLM and includes request for lock required by T2.
2. Master receives N1's T1 request, and sends a BAST to N2 specifying an unconditional downgrade request on p4, and a conditional downgrade request on p6
3. Master receives N2's BAST cancel message on p6 (assuming N2 cannot downgrade the lock on p6 at this time) and sends an AST on (p1, p2, p3, p5, p6, p7, p8) to N1 indicating the optional lock request on p6 failed. The locks on other pages will be granted as there is no conflict.
4. N1's local CLM receives the AST for (p1, p2, p3, p5, p6, p7, p8), and invokes BCM AST handler
5. BCM receives the AST for (p1, p2, p3, p5, p6, p7, p8). BCM marks the respective buffers appropriately (with locks granted or failed). At this point only page p4's lock request is pending and the rest of the pages are opened up for access and sleeping tasks are woken up. So T2 wakes up and finds that the lock it needs on page p6 was not granted and hence sends a new request to the lock manager; T2 sends PR->EX for 8 page mass (p1-NIP, p2-NIP, p3-NIP, p4-NIP, p5-NIP, p6-POI, p7-NIP, p8-NIP. However if N2 was able to downgrade the lock on p6 in step 3, the lock would be granted on p6 and T2 would go ahead and access the page.

6. In response to T2's request, N1's Local CLM sends PR->EX for 1 page mass (p6-POI) to master in T2
7. Master receives PR->EX for 1 page mass, and sends a BAST to N2 specifying an unconditional downgrade request on p6
8. Meanwhile if the lock on p4 is downgraded by N2, Master receives N2's downgrade message on p4, and sends an AST for p4 to N1
9. N1's local CLM receives the AST and hands it over to BCM. BCM will mark the buffer of p4 appropriately and wake up tasks sleeping on it. So T1 wakes up and accesses the page p4.
10. Now N2 manages to downgrade the lock on p6. The lock Master receives N2's downgrade message on p6, and sends an AST for p6 to N1
11. N1's local CLM hands over the AST to BCM which marks the buffer for p6 accordingly and wakes up T2.

In another case, suppose a request on overlapping MASSes from different instances is made. For example, consider the following the scenario:
1) N1's T1 asks for PR->EX for 4 page mass (p1-POI, p2-OP, p3-OP, p4-OP)
2) N2's T2 owns PR on 2 page mass (p1, p2) by virtue of holding a latch on p1, and it asks for PR on 1 page mass containing p3.

Based on these conditions:
1. Master gets N1's T1 request, it sends a BAST to N2 specifying an unconditional downgrade request on p1 and a conditional downgrade request on p2.
2. At this time if Master receives N2's PR request on p3, it would put the request to wait
3. N2's BCM receives the BAST, downgrades the lock on p2, (p1's downgrade is still pending)
4. Master gets N2's downgrade on p2 and sends an AST on (p2-granted, p3-granted, p4-granted) to N1
5. At this time master picks up the pending request on page p3 (from step 2 above) as once granted, the lock master can entertain locks requests on those pages from other nodes.
6. N1's BCM receives the AST for (p2, p3, p4), and marks those buffers accordingly and tasks at N1 can access those buffers.
7. N1's BCM receives BAST request on p3, and downgrades the lock on p3
8. Master receives N1's downgrade message on p3, and grants PR to N2 on p3
9. N2 BCM receives the AST to grant the lock on p3. At this time the task T2 on N2 will proceed and ultimately release the latch it holds on page p1. The downgrade request from N1 on page p1 now proceeds.
10. Master receives N2's downgrade message on p1, it grants EX to N1 on p1
11. N1's BCM receives the AST on page p1, marks the buffer accordingly and wakes up the task T1.

In another case, suppose a conditional lock request reaches Master when an unconditional request is pending. For example, consider the following the scenario:
1) N1 T1 asks for NL->EX on (p1-OP, p2-POI)
2) N2 owns PR on a mass (p1, p2)
3) A task T3 from N3 asks for NL->EX on (p1-POI, p2-OP)

Based on these conditions:
1. Master receives N1's request for EX on (p1-OP, p2-POI), it sees N2 owns PR on (p1, p2), so it sends a BAST to N2 specifying conditional downgrade on p1 and unconditional downgrade on p2
2. At this time if Master receives N3's request for NL->EX on (p1-POI, p2-OP), it puts this request to wait as the locks on p1 and p2 are being processed as part of an earlier request.
3. N2's BCM receives the BAST (from step 1), it sends a BAST cancel message on p1 to the lock master (assuming the lock cannot be downgraded within the chosen limit), and downgrades the lock on p2 (assuming there are no conflicting users of the page)
4. When Master receives BAST cancel on p1 from N2 (from step 4), it sends an AST on p1 to N1 indicating that the lock request failed. At this time it finds that the next request on p1 is from N3 and sends an unconditional BAST to N2 for page p1. At this time, N3's request for conditional lock on p2 (OP) is effectively blocked behind an unconditional lock request on p2 (from step 1). Depending on other factors, the CLM can choose to fail the conditional request at this point or after a certain time interval. Either way a possible deadlock is avoided.

As demonstrate by these examples, an attempt is always made to lock as many pages in the pool as possible. Multiple lock requests to CLM are allowed for the same MASS with different POI (i.e. on different pages) when no conditional lock requests are pending on them. Conditional lock requests are guaranteed to be resolved in a definite time and hence tasks can wait on them. In this manner, the locking is more adaptive to contention in the cluster, where, in a highly contentious system, more conditional locks are likely to fail and more downgrades are likely to be present on the pages of the pool, and hence, tasks will likely lock only the pages of interest in a buffer pool, but as contention decreases, more pages in the buffer pool are free, so that the entire buffer pool can be locked successfully.

Further, the approach works with the same granular-level locks to lock sub- or whole parts of the buffer pools (i.e., there are only buffer-level physical locks that are used and no table-level or such higher-level locks, which generally are more useful only for logical consistency) that are controlled by the client. Buffer-level locks provide more complete control to lock any set of buffers in the pool, i.e. any sub-part of the pool.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. In a distributed database processing environment comprising a plurality of nodes, a method for adaptive locking of retained resources, the method comprising:
   identifying a locking priority for at least a portion of a buffer pool, including identifying when different parts of the at least a portion have a different locking priority, wherein the locking priority further comprises at least one of a mandatory part, an optional part, and a part of no interest of the at least a portion of the buffer pool;
   determining lock requests based upon the identified locking priority, including determining different lock requests among parts of the at least a portion having the different locking priority; and
   granting locks for the determined lock requests.

2. The method of claim 1 wherein a client node sets the locking priority for physically locking at least one portion of the buffer pool.

3. The method of claim 1 wherein determining lock requests further includes determining conditional stators of a lock request based upon the identified locking priority.

4. The method of claim 1 further comprising utilizing contention among the nodes to control buffer pool locking.

5. The method of claim 1 wherein granting locks farther comprises requesting downgrading when needed from owner nodes.

6. A distributed shared disk cluster database system comprising:
   disk storage having at least one database;
   memory providing a plurality of pages in a buffer pool for the at least one database; and
   a plurality of nodes networked in the cluster, the plurality of nodes adapting to contention for the at least one database by:
   identifying a locking priority for at least a portion of the buffer pool, including identifying when different parts of the at least a portion have a different locking priority, wherein the locking priority further comprises at least one of a mandatory part, an optional part, and a part of no interest of the at least a portion of the buffer pool;
   determining lock requests based upon the identified locking priority including determining different lock requests among parts of the at least a portion having the different locking priority; and
   granting locks for the determined lock requests.

7. The system of claim 6 wherein a client node sets the locking priority for physically locking at least one portion of the buffer pool.

8. The system of claim 6 wherein determining lock requests further includes determining conditional status of a lock request based upon the identified locking priority.

9. The system of claim 6 wherein granting locks further comprises requesting downgrading when needed from owner nodes.

10. A computer program product including a computer-readable medium having instructions stored thereon that, if executed by a computing device, cause the computing device to perform operations for adaptive locking of retained resources in a distributed shared disk cluster database processing environment, the instructions comprising:
    identifying a locking priority for at least a portion of a buffer pool, including identifying when different parts of the at least a portion have a different locking priority, wherein the locking priority further comprises at least one of a mandatory part, an optional part, and a part of no interest of the at least a portion of the buffer pool;
    determining lock requests based upon the identified locking priority, including determining different lock requests among parts of the at least a portion having the different locking priority; and
    granting locks for the determined lock requests.

11. The computer program product of claim 10 wherein a client node sets the locking priority for physically locking at least one portion of the buffer pool.

12. The computer program product of claim 10 wherein determining lock requests further includes determining conditional status of a lock request based upon the identified locking priority.

13. The computer program product of claim 10 the locking priority further comprises at least one of a mandatory part, an optional part, and a part of no interest of the at least a portion of the buffer pool.

14. The computer program product of claim 10 further comprising utilizing contention among the nodes to control buffer pool locking.

15. The computer program product of claim 10 wherein granting locks further comprises requesting downgrading when needed from owner nodes.

16. In a distributed database processing environment comprising a plurality of nodes, a method for adaptive locking of retained resources, the method comprising:
    identifying a locking priority for at least a portion of a buffer pool, including identifying when different parts of the at least a portion have a different locking priority;
    determining lock requests based upon the identified locking priority, including determining different lock requests among parts of the at least a portion having the different locking priority; and
    granting locks for the determined lock requests, wherein granting the locks further comprises requesting downgrading when needed from owner nodes.

17. A distributed shared disk cluster database system comprising:
    disk storage having at least one database;
    memory providing a plurality of pages in a buffer pool for the at least one database; and
    a plurality of nodes networked in the cluster, the plurality of nodes adapting to contention for the at least one database by:

identifying a locking priority for at least a portion of the buffer pool, including identifying when different parts of the at least a portion have a different locking priority;

determining lock requests based upon the identified locking priority including determining different lock requests among parts of the at least a portion having the different locking priority; and granting locks for the determined lock requests, wherein granting the locks further comprises requesting downgrading when needed from owner nodes.

18. A computer program product including a computer-readable medium having instructions stored thereon that, if executed by a computing device, cause the computing device to perform operations for adaptive locking of retained resources in a distributed shared disk cluster database processing environment, the instructions comprising:

identifying a locking priority for at least a portion of a buffer pool, including identifying when different parts of the at least a portion have a different locking priority;

determining lock requests based upon the identified locking priority, including determining different lock requests among parts of the at least a portion having the different locking priority; and granting locks for the determined lock requests, wherein granting the locks further comprises requesting downgrading when needed from owner nodes.

* * * * *